United States Patent [19]
Holcombe, Jr. et al.

[11] 3,969,123
[45] July 13, 1976

[54] REFRACTORY CERAMIC COMPOSITIONS AND METHOD FOR PREPARING SAME

[75] Inventors: Cressie E. Holcombe, Jr., Knoxville; Margaret K. Morrow, Oak Ridge, both of Tenn.

[73] Assignee: The United States of America as represented by the United States Energy Research and Development Administration, Washington, D.C.

[22] Filed: Feb. 11, 1975

[21] Appl. No.: 548,940

[52] U.S. Cl. .................................. 106/55; 106/57; 106/733
[51] Int. Cl.² .................. C04B 35/66; C04B 35/68; C04B 35/70; C04B 35/48
[58] Field of Search ........................ 106/55, 73.3, 57

[56] References Cited
UNITED STATES PATENTS

| | | | |
|---|---|---|---|
| 2,802,748 | 8/1957 | Glaser | 106/55 |
| 3,699,044 | 10/1972 | Dosch | 106/57 |
| 3,706,583 | 12/1972 | Fletcher | 106/55 |
| 3,736,160 | 5/1973 | Hamling | 106/57 |
| 3,795,522 | 3/1974 | Fox | 106/55 |

*Primary Examiner*—Patrick P. Garvin
*Assistant Examiner*—John F. Niebling
*Attorney, Agent, or Firm*—Dean E. Carlson; David S. Zachry; Earl L. Larcher

[57] ABSTRACT

This invention relates to ceramic compositions of tungsten and tantalum oxides including 0 to 33 1/3 mole percent of a metal oxide such as hafnia. These ceramics are characterized by melting points greater than about 1400°C and selectively controlled coefficients of thermal expansion of essentially zero to a negative value in the temperature range of 20° to 1000°C.

6 Claims, No Drawings

REFRACTORY CERAMIC COMPOSITIONS AND METHOD FOR PREPARING SAME

The present invention was made in the course of, or under, a contract with the United States Atomic Energy Commission.

The present invention relates generally to the preparation of tantalum-tungsten oxide compositions, and more particularly to such compositions characterized by zero to negative thermal expansion coefficients and high temperature stability.

Refractory ceramic materials have been found to be useful in high temperature applications, such as turbine blades, furnace liners, crucibles, nuclear reactor control rods, crucible liners, and structural components employed in high temperature environments. Of particular desirability in many applications is that the ceramic material possess a high melting temperature of at least about 1400°C and dimensional stability in thermal environments especially such environments where temperatures may be cycled from about 20°to 1000°C.

The tantalum oxide-tantalum tungstate system has been previously identified such as evidenced in the publication "Journal of Solid State Chemistry," Vol. 2, 1970, pages 445–461. In this publication, a detailed study relating to the phase diagram of this system was conducted. However, this and other studies of this tungsten oxide-tantalum oxide system did not disclose any utility for the various compositions in this system. Applicants have, in turn, found that certain compositions in this system possess a coefficient of thermal expansion that is in the range of about zero to about a negative $5 \times 10^{-6}/°C$ over a temperature range of about 20° to 1000°C. This essentially contracting thermal expansion property is unexpected of these compositions since tungsten oxide and tantalum oxide each exhibit positive thermal expansion characteristics with relatively high coefficients and there was no suggestion in the literature that certain compositions of these oxides would possess zero to negative thermal expansion coefficients.

Accordingly, it is the primary aim or goal of the present invention to provide mixed oxide compositions which possess a melting temperature of at least about 1400°C and a minimal coefficient of thermal expansion over a temperature range of about 20° to 1000°C. This goal is achieved primarily by certain compositions in the tungsten oxide-tantalum oxide system ($WO_3$—$Ta_2O_5$) which are characterized by such high melting temperatures and a thermal expansion coefficient which may be selectively varied from essentially zero to a negative value when cycled over the above temperature range. The control of the thermal expansion coefficient is readily achieved by varying the mole ratio of the tungsten and tantalum oxides or by substituting for a portion of one of these oxides a refractory oxide characterized by an atomic radius within about 15 percent of the atomic radii of tungsten and tantalum.

Other and further objects of the invention will be obvious upon an understanding of the illustrative embodiments about to be described, or will be indicated in the appended claims, and various advantages not referred to herein will occur to one skilled in the art upon employment of the invention in practice.

The tantalum-tungsten oxide compositions found to provide satisfactory zero or negative thermal expansion properties over a temperature range of about 20° to 1000°C are those in which the $WO_3$ content is selectively varied from a lower limit of about 27 mole percent to an upper limit of about 69 mole percent while the tantalum oxide content is varied between 73 to 31 mole percent. With less than about 27 percent $WO_3$ the thermal expansion of the composition is greater than zero throughout the temperature range while with more than about 69 percent $WO_3$ the composition becomes relatively unstable at higher temperatures due to the volatility of $WO_3$.

The compositions of the present invention possess recurring single phases $Ta_{22}W_4O_{67}$, $Ta_2WO_8$, and $Ta_{16}W_{18}O_{94}$ with $WO_3$ concentrations at 27, 50, and 69 mole percent. These three phases have been analyzed for various physical properties, some of which are set forth in the table below.

TABLE

| Compositions | Chemical Analyses | | | | | | X-Ray Diffraction Analyses* Major | Purity By Mass Spectrographic Analysis (%) | R. T. Electrical Resistivity (ohm-cm) | ($\alpha \times 10^6$) Thermal Expansion Coefficient |
|---|---|---|---|---|---|---|---|---|---|---|
| | Theoretical % | | | Measured % | | | | | | |
| | Ta | W | O | Ta | W | O | | | | |
| $11Ta_2O_5 \cdot 4WO_3$ | 68.8 | 12.7 | 18.5 | 68.4 | 12.9 | 18.7 | $Ta_{22}W_4O_{67}$ | 99.67 | $200 \times 10^6$ | $+0.6 \times 10^{-6}/°C$** |
| $Ta_2O_5 \cdot WO_3$ | 53.7 | 27.3 | 19.0 | 53.6 | 27.5 | 19.0 | $Ta_2WO_8$ | 99.90 | $11 \times 10^6$ | $-2.0 \times 10^{-6}/°C$ |
| $8Ta_2O_5 \cdot 18WO_3$ | 37.6 | 42.9 | 19.5 | 38.0 | 42.9 | 19.1 | $Ta_{16}W_{18}O_{94}$ | 99.94 | $5 \times 10^6$ | $-5.1 \times 10^{-6}/°C$ |

*No Intermediate Or Minor Phases Were Observed.
**Essentially Zero Expansion to 800°C.

As shown in the table, the composition $Ta_{22}W_4O_{67}$ contains 27 mole percent $WO_3$ and has a coefficient of thermal expansion of $0.6 \times 10^{-6}$ cm/(cm-°C) over the temperature range of 20° to 1000°C. Actually, with this composition the thermal expansion is essentially zero up to approximately 800°C and then goes slightly positive so as to provide a positive expansion average as shown in the table. The thermal expansion may be maintained at zero or less by slightly increasing the $WO_3$ content above 27 mole percent. On the other hand, the phases $Ta_2WO_8$ and $Ta_{16}W_{18}O_{94}$, which contain 50 and 69 mole percent $WO_3$, respectively, have negative expansion or contraction throughout the temperature range of 20° to 1000°C with the latter phase having a coefficient of about $-5.1 \times 10^{-6}/°C$. With all three of these phases, a hysteresis exists between the heating and cooling stages.

The above (considering the phase diagram to have multiple phases in the region from $Ta_{22}W_4O_{67}$ to $Ta_2O_5$ and to be essentially unknown from $Ta_{16}W_{18}O_{94}$ to 100 percent $WO_3$) indicates that in the region studied the following occurs below 1400°C: The phases from $Ta_{22}W_4O_{67}$ to $Ta_2WO_8$ would be expected to have thermal contaction behavior of an average type (or linear fashion) of the end components $Ta_{22}W_4O_{67}$ and $Ta_2WO_8$; the phases $Ta_2WO_8$ to $Ta_{16}W_{18}O_{94}$ would be expected to have contraction behavior that is an average of the end components of the region, $Ta_2WO_8$ and $Ta_{16}W_{18}O_{94}$. since $WO_3$ itself has a very high expansion behavior (average coefficient of linear thermal expansion is $12.5 \times 10^{-6}$/°C in the range 350°–600°C), the behavior of thermal expansion of compositions in the region between $Ta_{16}W_{18}O_{94}$ and $WO_3$ is uncertain even though other compounds may exist in this region (there should be a composition with near zero expansion in the region somewhere between $Ta_{16}W_{18}O_{94}$ and $WO_3$ but the aforementioned high volatility of $WO_3$ makes this region of little practical interest). The expansion behavior of $Ta_{22}W_4O_{67}$ is near zero and slightly negative for most of the range 20° to 1000°C with the average low positive expansion indicating that further $Ta_2O_5$ concentrations would not be beneficial since $Ta_2O_5$ has a positive expansion behavior. Thus, these studies demonstrate that from 27 to 69 mole percent $WO_3$ (or the region between $Ta_{22}W_4O_{67}$ and $Ta_{16}W_{18}O_{94}$), near zero and negative thermal expansion compositions occur which are mixtures of phases $Ta_{22}W_4O_{67}$ and $Ta_2WO_8$, or $Ta_2WO_8$ and $Ta_{16}W_{18}O_{94}$, or that the expansion behavior of phase $Ta_2WO_8$ may be controlled more negative by adding more $WO_3$ (or $H_2WO_4$) and more toward zero by adding more $Ta_2O_5$.

The compositions of the present invention may be prepared by coprecipitation of organometallic precursors of tantalum and tungsten. The various metal alkoxides employed may be obtained commercially or prepared by conventional well-known procedures. These tantalum and tungsten alkoxides in the form of tert-amylates, isopropylates, or ethylates, are combined in quantities calculated to provide the desired molar ratio of the mixed oxides and are then refluxed for a duration of about 3 hours at 85°C in benzene. After refluxing, the solution is cooled and hydrolyzed by the dropwise addition of distilled water with vigorous stirring. The product of the coprecipitation is washed, filtered, and vacuum dried in air at a temperature of 50°C to 100°C for 24 to 48 hours, and then calcined in air at a temperature in the range of 800° to 1000°C. The calcined powders are then formed into the desired configuration, isostatically pressed at a pressure in the range of 10,000 to 50,000 psi and then sintered in flowing argon at a temperature of about 20 percent less than the melting temperature (about 1520° to about 1600°C for the tantalum-tungsten oxide compositions) with a soak time of about 2 to 4 hours followed by a furnace cooling period of about 2 hours.

A typical preparation of a tantalum-tungsten oxide composition by employing cohydrolysis is set forth below.

EXAMPLE I

In a typical run, 21.8 grams of tetraisopropyl oxytungstate were blended with 49.6 grams of pentaisopropyl tantalate to provide 50 and 50 mole percent tungsten and tantalum oxides, respectively, in the article to be formed. The blended mixture of metal alkoxides was refluxed in a benzene solution for three hours at a temperature of 85°C. After refluxing, the solution was cooled to room temperature and hydrolyzed by dropwise addition of distilled water. During hydrolysis of the alkoxides, the solution was vigorously stirred to enhance homogeneity in the mixture of precipitated hydroxides. After filtering and washing the hydroxide precipitates, they were dried at a temperature of 50°C in a vacuum atmosphere for 24 hours. The metal hydroxides were calcined at temperatures in the 800° to 1000°C range in air for 40 hours. The resultant mixed oxide powders were isostatically pressed at 30,000 psi to form a cylindrically shaped article having a diameter of 0.5 inch and a length of 1.5 inches. The article was sintered at 1500°C in flowing argon and then cooled to ambient temperature in argon. chemical analyses indicated that the article was composed of 49.2 mole percent tungsten trioxide ($WO_3$) and 50.8 mole percent tantalum pentaoxide ($Ta_2O_5$). The molecular composition of the oxides in the article was confirmed as $Ta_2WO_8$ by X-ray diffraction. The thermal expansion coefficient for the article was $-2.2 \times 10^{-6}$cm/(cm-°C) measured at temperatures in the range of 20° to 1000°C. The thermal expansion was negative throughout the temperature range of the test. Density measurements indicated a density of 5.90 gm/cc and a porosity of 27.5 percent. Differential thermal analysis indicated an average melting point of 1530°C for the article. Thermal analysis showed the composition to be stable up to 1400°C which is within 200°C of the melting point for $WO_3$. At 1430°C the $WO_3$ began to volatilize.

Alternatively, the tantalum-tungsten oxide compositions may be readily prepared employing appropriate mixtures of tantalum pentaoxide ($Ta_2O_5$) and tungstic acid ($H_2WO_4$), isostatically pressing the mixture at 10,000 to 50,000 psi, calcining the compact at 1000°C for about 3 to 6 days, grinding the calcined compact into powder having an average particle size of about 30 microns, isostatically pressing the powder into the desired article configuration at a pressure in the range of about 30,000 to 50,000 psi, and then sintering the pressed article in air at a temperature of 1350°C for about 3 to 8 hours. The analysis of resulting product showed that the materials were within about 0.5 percent of the theoretical for each of the three above-mentioned single phase compounds and have elemental purities of greater than 99.6 percent.

A further aspect of the present invention is the addition of a metal oxide to the tantalum-tungsten oxide composition prior to sintering for selectively increasing the coefficient of thermal expansion to any desired value between the most negative value provided by $Ta_{16}W_{18}O_{94}$ to zero with the coefficient at each value remaining essentially constant over the 20° to 1000°C temperature range. The metal oxide employed forms a solid solution with the $Ta_2WO_8$ or $Ta_{16}W_{18}O_{94}$ phases and is substituted for the tantalum oxide or tungsten oxide in quantities up to 33 1/3 mole percent. For the purpose of this description and claims, the term "up to" includes zero mole percent.

A continuous solid solution of the metal oxides and the tantalum-tungsten oxide is necessary to effect the desired control over the thermal expansion characteristics since a sintered mixture of the substituted metal oxide with the single phase tantalum-tungsten oxides will provide expansion behavior corresponding to the average of the separate phases. In order to assure that a solid solution will be provided, it is necessary that the metal oxide be substituted in the composition on an ion for ion basis. To obtain this substitutional solid solution the metal oxides useable are those which have an atomic radius within 15 percent of the atomic of $Ta^{+5}$ (0.73A) and $W^{+6}$ (0.68A). Thus, for $Ta^{+5}$, metals with ionic radii between 0.62 and 0.84A would be expected to form continuous solid solubility, if the valence state were close to that of +5 (say +4 to +6); however, for oxides, if the valence state is less than +5, an inherent oxygen deficiency will exist for the structure; if greater than +5, an inherent oxygen excess will occur. The same reasoning applies to $W^{+6}$, where metals with ionic radii between 0.58 and 0.78A would be expected to substitute for tungsten ions. Since either $W^{+6}$ to $Ta^{+5}$ positions may be occupied, the range of acceptable ionic radii for continuous substitutional solid solubility is 0.58 to 0.84A, and includes $Ti^{+4}$ (0.68A), $Zr^{+4}$ (0.80A), $Hf^{+4}$ (0.81A), $Nb^{+5}$ (0.70A), $V^{+5}$ (0.59A), and $Mo^{+6}$ (0.62A). Thus, the oxides of these metals would be useful for solid solution control of thermal expansion behavior of the tantalum-tungstates studied. Hafnium oxide ($HfO_2$) is used in the example below to show the preparation of the ternary composition because $HfO_2$ is the highest melting of the metal oxides listed above. The composition $HfO_2 \cdot Ta_2O_5 \cdot WO_3$ contained 33 ⅓mole percent of each of the oxide constituents and yielded virtually zero thermal expansion, i.e., less than $0.3 \times 10^{-6}$ over the aforementioned temperature range. Greater $HfO_2$ contents than 33 ⅓mole percent will increase the expansion to a positive value from the zero value of the $HfO_2 \cdot Ta_2O_5 \cdot WO_3$ composition; whereas $HfO_2$ contents less than 33 ⅓mole percent would give contracting behavior similar to that of $Ta_2WO_8$ and would approach the behavior of $Ta_{16}W_{18}O_{94}$ as the $HfO_2$ content approaches zero.

The examples below relates to a typical preparation of a ternary composition in which the thermal expansion coefficient is virtually zero in the temperature range of 20° to 1000°C.

EXAMPLE II

In this example an equimolar mixture of the oxides was prepared by blending 55.56 grams of tetraisopropyl oxytungstate, 105.10 grams of pentaisopropyl tantalate, and 45.68 grams of tetraisopropyl hafnate. This blend was then refluxed in a benzene solution for three hours at a temperature of 85°C to homogenize the solution. After cooling the solution, the metal alkoxides were hydrolyzed with dropwise additions of distilled water. During the hydrolyzing operation, the solution was stirred vigorously to enhance homogeneity in the precipitated metal hydroxides. After filtering and washing the precipitate, it was dried in a vacuum atmosphere at 50°C for 24 hours. The dry precipitate was calcined in air at temperatures ranging from 800° to 1000°C for 40 hours. The dry oxide powder was isostatically pressed with 30,000 psi into a cylinder having a 0.5-inch diameter and a length of 1.5 inches. The pressed cylinder was sintered in flowing argon at a temperature of 1300°C. Chemical analyses indicated that the body was composed of 23.2 weight percent hafnium dioxide, 28.5 weight percent tungsten trioxide, and 48.8 weight percent tantalum pentaoxide. Differential thermal analysis and thermal gravimetric analysis showed the composite to have a melting point of 1418°C with a broad exotherm over the temperature range of 1000° to 1180°C. The sintered body had a bulk density of 4.93 gm/cc, an apparent specific gravity of 8.38 and a porosity of 41 percent. X-ray diffraction showed a tantalum tungstate ($Ta_2WO_8$) type major phase in solid solution with hafnium dioxide. Thermal expansion measurements gave an average thermal expansion coefficient of $0 \times 10^{-6}$ cm/cm°C.

It will be seen that the binary or ternary compositions of the present invention provide for the fabrication of ceramic articles particularly suitable in applications where the temperature may fluctuate in a wide range of about 20° to 1000°C and especially in such applications where the thermal expansion over this temperature range is necessarily maintained at a zero or negative (contraction) value.

What is claime is:

1. An article of manufacture comprising a sintered composition consisting of a solid solution of tungsten oxide in a concentration in the range of 27 to 69 mole percent tantalum oxide in a concentration in a range of 73 to 31 mole percent and up to about 33 ⅓ mole percent of a metal oxide selected from the group consisting of hafnium oxide, titanium oxide, zirconium oxide, vanadium oxide, niobium oxide, and molybdenum oxide, with said metal oxide being substituted for one of the tungsten oxide and the tantalum oxide said article being characterized by possessing a coefficient of thermal expansion in the range of about zero to about a negative $5.1 \times 10^{-6}$ cm/(cm-°C) over a temperature range of about 20° to 1000°C.

2. The article of manufacture as claimed in claim 1, wherein the article has a single phase $Ta_{22}W_4O_{67}$ with 27 mole percent tungsten oxide, a single phase $Ta_2WO_8$ with 50 mole percent tungsten oxide, and a single phase $Ta_{16}W_{18}O_{94}$ with 69 mole percent tungsten oxide, and wherein the coefficient of thermal expansion has a more negative value with increasing tungsten oxide content in said range of 27 to 69 mole percent.

3. The article of manufacture as claimed in claim 1, wherein the solid solution consists of equimolar proportions of tantalum oxide, tungsten oxide, and hafnium oxide, and wherein said article is characterized by a coefficient of thermal expansion of less than $0.3 \times 10^{-6}$ cm/(cm-°C) over said temperature range.

4. A method of manufacturing an article to be used in a high temperature application in which the temperature is cyclic in a range between about 20° to 1000°C and in which the article must possess a coefficient of thermal expansion in the range of about zero to about $-5 \times 10^{-6}$ cm/(cm-°C) throughout said temperature range, said method comprising the steps of providing a metal oxide mixture having a tantalum oxide content in the range of 73 to 31 mole percent, a tungsten oxide content in the range of 27 to 69 mole percent, and up to about 33 ⅓ mole percent of an additional metal oxide selected from the group consisting of hafnium dioxide, zirconium dioxide, and titanium dioxide, isostatically pressing the mixture into the desired article configuration, and thereafter heating the pressed mixture at a temperature sufficient to sinter the mixture and form said article which is characterized by having single phases $Ta_{22}W_4O_{67}$, $Ta_2WO_8$, and $Ta_{16}W_{18}O_{94}$ with tungsten oxide contents of 27, 50, and 69 mole percent, respectively, when said additional metal oxide contents is zero.

5. A method of manufacturing an article as claimed in claim 4, wherein said mixture consists of equimolar proportions of tantalum oxide, tungsten oxide, and hafnium oxide, and wherein said article possesses a coefficient of thermal expansion of less that $0.3 \times 10^{-6}$ cm/(cm-°C) over said temperature range.

6. A method of selectively increasing the coefficient of thermal expansion of a composition consisting of tantalum oxide and tungsten oxide from a negative value of about $-5 \times 10^{-6}$ cm/(cm-°C) about $0.0 \times 10^{-6}$°C over a temperature range of about 20° to 1000 cm/cm-°C comprising the step of decreasing the tungsten oxide content in said composition to a selected mole percent in the range of about 69 to 27 mole percent.

* * * * *